United States Patent [19]
Rao et al.

[11] Patent Number: 5,874,134
[45] Date of Patent: Feb. 23, 1999

[54] PRODUCTION OF NANOSTRUCTURED MATERIALS BY HYPERSONIC PLASMA PARTICLE DEPOSITION

[75] Inventors: Nagaraja P. Rao; Steven L. Girshick; Peter H. McMurry, all of Minneapolis; Joachim V. R. Heberlein, North Oaks, all of Minn.

[73] Assignee: Regents of The University of Minnesota, Minneapolis, Minn.

[21] Appl. No.: 790,371

[22] Filed: Jan. 28, 1997

Related U.S. Application Data

[60] Provisional application No. 60/010,763 Dec. 1, 1996.
[51] Int. Cl.$^6$ ........................................................ B05D 1/02
[52] U.S. Cl. .......................... 427/446; 427/452; 427/562; 427/563; 427/569; 427/578; 427/421; 427/427; 118/302
[58] Field of Search ........................... 427/562, 563, 427/569, 578, 452, 446, 421, 427; 239/79; 118/302

[56] References Cited

U.S. PATENT DOCUMENTS

| | | | |
|---|---|---|---|
| 4,657,187 | 4/1987 | Hayashi | 239/556 |
| 4,788,082 | 11/1988 | Schmitt | 427/248.1 |
| 5,021,221 | 6/1991 | Gould et al. | 422/129 |
| 5,110,435 | 5/1992 | Haberland | 204/192.31 |
| 5,270,542 | 12/1993 | McMurry et al. | 250/288 |
| 5,387,462 | 2/1995 | Debe | 428/245 |
| 5,459,016 | 10/1995 | Debe et al. | 430/201 |
| 5,460,701 | 10/1995 | Parker et al. | 204/164 |
| 5,481,357 | 1/1996 | Ahsan et al. | 356/338 |
| 5,514,350 | 5/1996 | Kear et al. | 422/198 |

OTHER PUBLICATIONS

"Nanoparticle Formation Using a Plasma Expansion Process," by N. Rao et al., *Plasma Chemistry and Plasma Proceeding*, vol. 15, No. 4., 1995, pp. 581–606. (No Month Date).

"Hypersonic Impaction of Ultrafine Particles," by J. Mora et al., *J. Aerosol Sci.*, vol. 21, No. 2, 1990, pp. 169–187. (No Month Date).

"Hypersonic Deposition Forms Pure, Fine–Grained Nanostructures,", *High–Tech Materials Alert*, vol. 12, No. 2, Feb. 1995, p. 2.

"Hypersonic Deposition Makes Nanostructures," *Advanced Coatings & Surface Technology*, vol. 8, No. 2, Feb. 1995, pp. 6–7.

Synthesis of Nanophase Silicon, Carbon, and Silicon Carbide Powders Using a Plasma Expansion Process, by N. Rao et al., *J. Mater. Res.*, vol. 10, No. 8, Aug. 1995 pp. 2073–2084.

"Nanocrystalline Materials," by H. Gleiter, *Progress in Materials Science*, vol. 33, 1989, pp. 223–315. (No Month Date).

"Synthesis and Properties of Nanophase Materials," by R. Siegel, *Materials Science and Engineering*, 1993, pp. 189–197. (No Month Date).

"Design and Operation of a Nanocluster Generation and Collection System," by K. Recknagle et al., *Aerosol Science and Technology*, vol. 22, No. 3, 1995, pp. 4–10. (No Month Date).

"Ultra Fine Particle Films By Gas Deposition Method," by M. Oda et al., *Mat. Res. Soc. Symp. Proc.*, vol. 286. 1993, pp. 121–130. (No Month Date).

(List continued on next page.)

*Primary Examiner*—Katherine A. Bareford
*Attorney, Agent, or Firm*—Westman, Champlin & Kelly, P.A.

[57] ABSTRACT

A method and apparatus for the controlled synthesis and assembly of nanoparticles into nanostructured materials, including nanocomposites, includes a source of nanoparticles and a hypersonic impaction apparatus. The nanoparticles are impacted on a substrate through hypersonic impaction to thereby provide nanostructured materials as well as nanophase materials.

19 Claims, 4 Drawing Sheets

OTHER PUBLICATIONS

"Powder Temperature, Size, and Number Density in Laser–Driven Reactions," by J. Flint et al., *Aerosol Science and Technology,* 1986, pp. 249–260. (No Month Date).

"Surface Impact of Seeded Jets at Relatively Large Background Densities," by J. Fernandez de la Mora, *J. Chem. Phys.,* vol. 82, No. 7, Apr. 1, 1985, pp. 3453–3464.

"Gas Jet Deposition of Thin Films," by B.L. Halpern et al, *Applied Surface Science,* 1991, pp. 19–26. (No Month Date).

"Deposition of Ultra Fine Particles Using a Gas Jet," by S. Kashu et al., *Japanese Journal of Applied Physics,* vol. 23, No. 12, dec. 1984, pp. 910–912.

"A New Gas–Phase Combustion Synthesis Process for Pure Metals, Alloys, and Ceramics," by H.F. Calcote et al., *Twenty–Fourth Symposium (International) on Combustion/ The Combustion Institute,* 1992, pp. 1869–1876. (No Month Date).

"Production of a TiN Film with Nanoscale Particle Size by a Combined Method of Plasma–Alloy Reaction and Spray Deposition," by A. Inoue et al., *Journal of Materials Science Letters* 11, 1992, pp. 865–867. (No Month Date).

"Thin Films From Energetic Cluster Impact: A Feasiblity Study," by H. Haberland et al., *J. Vac. Sci. Technol. A,* vol. 10, No. 5, Sep./Oct. 1992, pp. 3266–3271.

"Nanocrystalline Structures Prepared by Neutral Cluster Beam Deposition," by A. Perez et al., *Nanostructured Materials,* vol. 6, 1995, pp. 43–52. (No Month Date).

"Growth of Silicon Carbide Films Via $C_{60}$ Percursors," by A.V. Hamza et al., *Surface Science Letters,* 1994, pp. L1129–L1135. (No Month Date).

"Dynamics of Cluster–Surface Collisions," by C.L. Cleveland et al., *Science,* vol. 257, Jul. 17, 1992, pp. 355–361.

"Controlled Deposition, Soft Landing, and Glass Formation in Nanocluster–Surface Collisions," by Hai Ping Cheng et al., *Science,* 1993, pp. 1304–1307. (No Month Date).

PRODUCTION OF NANOSTRUCTURED MATERIALS BY HYPERSONIC PLASMA PARTICLE DEPOSITION

GOVERNMENT RIGHTS

The United States government has certain rights in this invention pursuant to Agency Grant No. ECS-9118100 awarded by the National Science Foundation.

BACKGROUND OF THE INVENTION

The present application claims the benefit of earlier filed U.S. Provisional Application No. 60/010,763, entitled PRODUCTION OF NANOSTRUCTURED MATERIALS BY HYPERSONIC PLASMA PARTICLE DEPOSITION filed on Jan. 29, 1996.

The present invention relates to nanostructured materials. Further, the present invention relates to a method and apparatus for production of such materials.

The synthesis and processing of nanophase or nanostructured materials, i.e. materials with grain sizes less than about 100 nm, is of great interest as such materials are known to have properties different from and often superior to those of conventional bulk materials. Examples include greater strength, hardness, ductility, and sinterability; size dependent light absorption, greater reactivity etc. There has been considerable progress in determining the properties of nanophase materials, small amounts of which have been synthesized (mainly as nanosize powders) by a number of processes including colloidal precipitation, mechanical grinding, and gas-phase nucleation and growth. Extensive reviews have documented recent developments in nanophase materials (Gleiter, H. (1989) "Nanocrystalline materials," *Prog. Mater. Sci.* 33:223–315); (Siegel, R. W. (1993) "Synthesis and properties of nanophase materials," *Mater. Sci. Eng.* A168:189–197). The potential applications of nanophase materials include wear resistant coatings, thermal barrier coatings, ductile ceramics, new electronic and optical devices, catalysts etc. However, before the benefits of this emerging technology can be realized in the form of commercial products, two challenging problems need to be addressed, namely, (1) controlled, high-rate synthesis of nanosize powders, and (2) assembly of these powders into nanostructured materials. Controlled synthesis implies that the particles are uniform in size, composition and morphology, and are substantially unagglomerated, and generally requires that the consolidation or assembly be done in-situ to avoid contamination.

Gas-phase nucleation and growth of particles is an established route for the synthesis of nanosize powders (Gleiter, H. (1989) "Nanocrystalline materials," *Prog. Mater. Sci.* 33:223–315) and includes such techniques as evaporation-condensation (Recknagle, K., Leung, A., Brown, D., Martian, P., Chung, J. N., Xia, Q., Hamilton, H. and Crowe, C. T. (1995) "Design and operation of a nanocluster generation and collection system," *Aerosol Sci. Technol.* 22:3–10 1995) and (Oda, M., Katsu, I., Tsuneizumi, M., Fuchita, E., Kashu, S. and Hayashi, C. (1993) "Ultrafine particle films by gas deposition method,"*Mat. Res. Soc. Symp. Proc.* 286:121–130), laser pyrolysis (Flint, J. H., Marra, R. A. and Haggerty, J. S. (1986) "Powder temperature, size and number density in laser-driven reactions," *Aerosol Sci. Technol.* 5:249–260) and thermal plasma expansion (Rao, N., Girshick, S., Heberlein, J., McMurry, P., Jones, S., Hansen, D., Micheel, B. (1995) "Nanoparticle formation using a plasma expansion process," *Plasma Chem. Plasma Proc.*, 15(4):581–606 and Rao, N., Micheel, B., Hansen, D., Fandrey, C., Bench, M., Girshick, S., Heberlein, J., and McMurry, P. H. (1995) "Synthesis of nanophase silicon, carbon and silicon carbide powders using a plasma expansion process," *J. Mater. Res.* 10(8): 2073–2084). In many of these gas-phase processes, the nanosize powders were collected thermophoretically and consolidated in-situ using high pressure compaction (Gleiter, H. (1989) "Nanocrystalline materials," *Prog. Mater. Sci.* 33:223–315) and (Recknagle, K., Leung, A., Brown, D., Martian, P., Chung, J. N., Xia, Q., Hamilton, H. and Crowe, C. T. (1995) "Design and operation of a nanocluster generation and collection system," *Aerosol Sci. Technol.* 22:3–10) to produce pellets of nanostructured materials.

The use of impinging jets for materials processing is based on the fact that heavy particles seeded in a light carrier gas can be deposited efficiently by expanding the particle-gas mixture through a nozzle and directing the resulting jet against an impaction substrate (Marple, V. A. (1970) "A Fundamental Study of Inertial Impactors," Ph.D. Thesis, Mechanical Engineering Department, University of Minnesota, Minn.), (Fernandez de la Mora, J. (1985) "Surface impact of seeded jets at relatively large background densities," *J. Chem. Phys.* 82:3453–3464) and (Fernandez de la Mora, J., Hering, S. V., Rao, N. and McMurry, P. H. (1990) "Hypersonic impaction of ultrafine particles," *J. Aerosol Sci.* 21:169–187). The host gas is decelerated as it approaches the impaction substrate, whereas the heavy particles, provided they are larger than a certain critical size, continue their forward motion and impact by virtue of their greater inertia. The critical particle size for impaction to occur depends on the nozzle geometry, gas properties (pressure, temperature, composition and velocity), and particle properties (density, shape etc.) . In the past, impaction of heavy particles had been a useful technique for particle size measurement (Fernandez de la Mora, J., Hering, S. V., Rao, N. and McMurry, P. H. (1990) "Hypersonic impaction of ultrafine particles," *J. Aerosol Sci.* 21:169–187) and for collecting particle samples for microscopic analysis (Rao, N., Micheel, B., Hansen, D., Fandrey, C., Bench, M., Girshick, S., Heberlein, J., and McMurry, P. H. (1995) "Synthesis of nanophase silicon, carbon and silicon carbide powders using a plasma expansion process," *J. Mater. Res.* 10(8):2073–2084). In recent times, however, a number of materials deposition processes based on impaction principles have been developed, including those that deposit heavy molecules (Schmitt, J. J. (1988) "Method and apparatus for the deposition of solid films of a material from a jet stream entraining the gaseous phase of said material," U.S. Pat. No. 4,788,082) and (Halpern, B. L., Schmitt, J. J., Golz, J. W., Johnson, D. L. (1991) "Gas jet deposition of thin films," *Appl. Surf. Sci.* 48/49:19–26), ultrafine particles (Kashu, S., Fuchita, E., Manabe, T. and Hayashi, C. (1984) "Deposition of ultrafine particles using a gas jet," *Japn. J. Appl. Phys.* 23:L910–912), (Oda, M., Katsu, I., Tsuneizumi, M., Fuchita, E., Kashu, S. and Hayashi, C. (1993) "Ultrafine particle films by gas deposition method," *Mat. Res. Soc. Symp. Proc.* 286:121–130) and (Hayashi, C. (1987) "Ultrafine Particle Spraying Apparatus," U.S. Pat. No. 4,657,187) and large micron-sized particles (Calcote, H. F. and Felder, W. (1992) "A new gas-phase combustion synthesis process for pure metals, alloys, and ceramics," pp.1869–1876 in 24*th Symp. (Intl.) on Combustion,* Combustion Inst., Pittsburgh) and (Gould, R. K. and Dickson, C. R. (1991) "Apparatus for producing high purity silicon from flames of sodium and silicon tetrachloride," U.S. Pat. No. 5,021,221). These processes also differ widely in the source of deposited materials, the flow and pressure regimes used for impaction, as well as the microstructure of the materials produced. Related processes wherein nozzle generated cluster beams at far lower pressure also have been used for producing thin films (Haberland, H., Karrais, M., Mall, M. and Thurner, Y. (1992) "Thin films from energetic cluster impact: a feasibility study,." *J. Vac. Sci. Technol.* A 10(5): 3266–3271) and (U.S. Pat. No. 5,110,435) and nanocrystalline deposits (Perez, A., Melinon, P., Paillard, V., Dupuis, V., Jensen, P., Hoareau, A., Perez, J. P., Tuaillon, Broyer, M., Vialle, J. L., Pellarin, M., Baguenard, B., and Lerme, J. (1995) "Nanocrystalline Structures Prepared by Neutral Cluster Beam Deposition," *Nanostructured Materials* 6:43–52). In general, the smaller the particles to be deposited, the higher the flow speeds, and the lower the pressures required for impaction to occur. For particles in the nanometer size regime, a highly supersonic (i.e. hypersonic) flow may be used for impaction (Fernandez de la Mora, J., Hering, S. V., Rao, N. and McMurry, P. H. (1990) "Hypersonic impaction of ultrafine particles," *J. Aerosol Sci.* 21:169–187). In such hypersonic impactors, the seeded gas flow expands through a nozzle into a vacuum, and the flow downstream of the nozzle is accelerated to very high Mach numbers, on the order of 5. The gas is then rapidly decelerated in the shock layer formed ahead of the impaction substrate, while heavy particles larger than the critical size are impacted, forming a deposit.

The high particle kinetic energies associated with hypersonic impaction may be used to activate physical and/or chemical transformations at the deposition surface. An example of such a transformation was demonstrated for the case of heavy molecules by Fernandez de la Mora, J. (1985) "Surface impact of seeded jets at relatively large background densities," *J. Chem. Phys.* 82:3453–3464, who decomposed $W(CO)_6$ molecules seeded in hydrogen gas by hypersonic impaction against a clean surface. A solid non-volatile coating was formed on the impaction surface. More recently, Hamza, A. V., Balooch, M. and Moalem, M. (1994) "Growth of silicon carbide films via $C_{60}$ precursors," *Surf. Sci.* 317:L1129–L1135 have produced silicon carbide structures by impacting a molecular beam of fullerenes against a heated silicon substrate. A similarly high velocity reactive deposition process for nanosized particles is suggested by recent molecular dynamics simulations of argon nanoparticles impacting at 3 km/s (Cleveland, C. L. and Landman, U. (1992) "Dynamics of Cluster-Surface Collisions," *Science* 257:355–361). These simulations have determined that the atoms in the impacting particle are inertially confined in a transient (picosecond) chemically reacting environment characterized by extreme local density (up to 50% above normal liquid density), pressure (>10 GPa), and kinetic temperature (~4000K). They suggest that the intense, transient, "nano-shock" phenomena associated with the compressed non-equilibrium environment may initiate new modes of chemical reactions, which are then quenched by rapid energy exchange with the temperature-controlled substrate (Cheng, H.-P. and Landman, U. (1993) "Controlled deposition, soft landing, and glass formation in nanocluster-surface collisions," *Science* 260:1304–1307).

SUMMARY OF THE INVENTION

One aspect of the present invention includes a new method for the controlled synthesis and assembly of nanophase powders into nanostructured materials, including nanocomposites. Nanosize particles (nanoparticles) are produced by gas-phase nucleation and growth in a high-temperature aerosol reactor such as a thermal plasma expansion reactor, followed by hypersonic impaction of the particles onto a temperature controlled substrate. Hypersonic impaction may be used for consolidation of particles into dense nanostructured materials as well as for producing novel nanophase materials through chemical reactions activated at high impaction velocities.

DETAILED DESCRIPTION OF THE PREFERRED EMBODIMENTS

Figure 1:
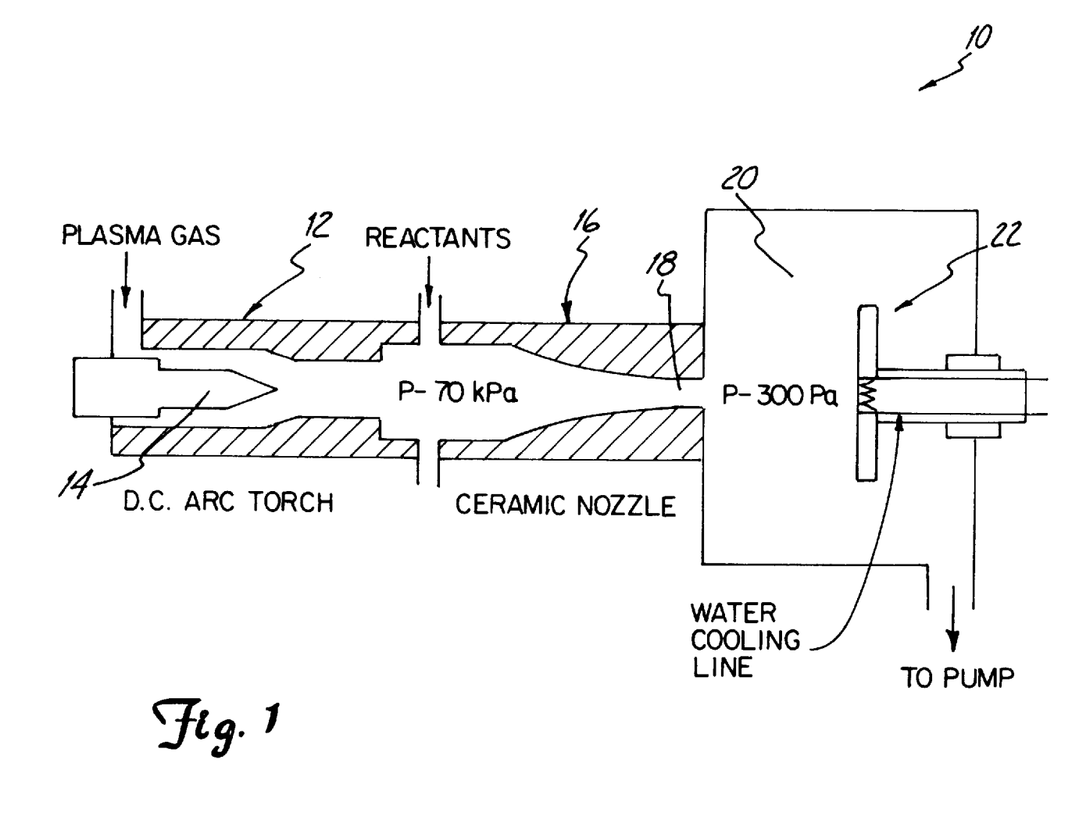
FIG. 1 is a simplified block diagram of a hypersonic plasma particle deposition apparatus for producing nanostructured material in accordance with the present invention.

A novel apparatus 10 for producing nanostructured materials is shown schematically in FIG. 1. A nanoparticle generating reactor 12 (or aerosol reactor) is operated in a hypersonic impactor. Reactor 12 consists of a high temperature energy source 14 which is used to dissociate and/or react precursor species seeded in a light carrier gas. In a preferred embodiment, this is a DC plasma torch or a high energy laser such as a $CO_2$ laser. The hot reacting gas mixture is rapidly quenched by expansion through a converging nozzle 16 to induce gas-phase nucleation and growth of nanosize particles. These particles are further accelerated in the hypersonic expansion following the nozzle throat 18 as they expand into chamber 20, and are collected by impaction against a temperature-controlled substrate 22. The high deposition speed induces consolidation of the deposited particles, and the goal is to produce nanostructured deposits by preventing grain growth through suitable control of the substrate temperature. By suitably choosing the carrier gas and source conditions (i.e. temperature and pressure), the particle impaction velocity may be gasdynamically controlled over a wide range (for example, 0.5–5 km/s) so as to activate a correspondingly wide range of physical and chemical transformations upon impact. Note that the purpose of impacting particles rather than vapor molecules is to deliberately introduce grain boundaries in the deposit formed. The hypersonic plasma particle deposition process (HPPD) is thus different from those described earlier in one or more of the following: (1) the size range of particles deposited (for example, 1–100 nm); (2) the range of deposition velocities used (for example, 0.5–5 km/s), which are significantly higher than previous velocities; (3) the nanostructured nature of the deposit formed; (4) the reactive nature of the deposition at higher velocities; and (5) the higher possible deposition rate. Such high particle velocities may be obtained by expanding light carrier gases (e.g. He or $H_2$) from suitably high source temperatures (for example, 1000–3000K) and pressures (for example, about 1 atm).

In one embodiment of this process, particles in the sub-10 nm range are formed in nozzle 16; their in-flight agglomeration is minimized by hypersonic transport; in situ consolidation of the particles is accomplished by ballistic impact on the substrate at moderate velocities (for example, on the order of or more than about 0.5 km/s); and densification with minimum grain growth is accomplished by controlling the substrate temperature. In another embodiment, nanoparticles formed in nozzle 16 are hypersonically impacted at extremely high velocities (for example, about 3 km/s), whereby non-equilibrium modes of chemistry are activated to obtain desired chemical transformations upon particle impact. In yet another embodiment, nanostructured composites may be formed by using multiple hypersonic particle jet sources to embed nanoparticles of one material within a nanoparticle matrix of a second material. In all the embodiments described above, either a dense coating or a free-standing material may be obtained by suitable choice of process parameters and of substrate (and consequent adhesion). Hypersonic plasma particle deposition is thus a one-step process for the production of nanostructured materials.

The ability of the hypersonic plasma particle deposition process to consolidate and synthesize materials finds a parallel in a different, though somewhat related powder technology—i.e. materials consolidation and synthesis by shock compression. In the latter process, a batch of powder is subject to impaction by a projectile traveling at speeds on the order of severalkm/s, i.e. in the same range of velocities considered in the proposed process. The resulting shock wave travels through the powder, also at similar speeds, resulting in rapid physical and/or chemical transformation of the powder. This technology has been used to produce dense, sintered compacts and composites from powder, and various materials have been successfully consolidated, including some very hard materials like diamond, cubic boron nitride and nanocrystalline diamond powders (Kondo, K. -I., and Sawai, S. (1990) "Fabricating nanocrystalline diamond ceramics by a shock compression method," *J. Am. Ceram. Soc.* 73:1983–1991).

Shock compression of powders is a versatile technology and has also been used as a synthesis process for producing intermetallics (Strutt, A. J., Vecchio, K. S., Yu, L. -H., Meyers, M. A. and Graham, R. A. (1993) "Shock synthesis of nickel-aluminides," *AIP Conf. Proc.* 309:1243–1246) and (Strutt, A. J., Vecchio, K. S., Yu, L. -H., Meyers, M. A. and Graham, R. A. (1993) "Shock synthesis of nickel-aluminides," *AIP Conf. Proc.* 309:1243–1246) and ceramics (Freim, J., McKittrick, J. and Nellis, W. J. (1993) "Shock compaction of alumina/zirconia ceramics," *AIP Conf. Proc.* 309:1263–1266). Shock compression has also been successful in synthesizing hard materials like diamond (DeCarli, P. S. and Jamieson, J. C. (1961) "Formation of diamond by explosive shock," *Science* 133:1821–1822) and (Hirai, H. and Kondo, K. -I. (1991) "Modified phases of diamond formed under shock compression and rapid-quenching," *Science* 253:772–774) using graphite and fullerites as starting materials. The high pressures, temperatures, and fast quench rates possible with shock compression appear to favor the transformation from graphite to diamond. A transformation from hexagonal boron nitride to cubic boron nitride also appears feasible (Fukunaga, O. (1989) "Synthesis of superhard materials," pp. 10–20 in *High Pressure Chemical Synthesis,* Eds. Jurczack, J. and Baranowski, B., Elsevier) and (Trebinski, R., Wlodarczyk, E., Cudzilo, S., Paszula, J., and Trzcinski, W. "Investigations into the detonative synthesis of bBN," *AIP Conf. Proc.* 309:1283–1286). The hypersonic plasma particle deposition process may be applied to a similarly wide range of materials. One significant advantage of this technique over conventional shock compression is that the nanophase materials are processed in a continuous manner by impacting successive layers of particles onto the substrate. In addition, hypersonic particle deposition has the ability to produce both adherent films as well as free standing deposits. Finally, the gradual nature of the deposition process should also lead to lower stress levels than in conventional shock processing.

Figures 2, 2A:
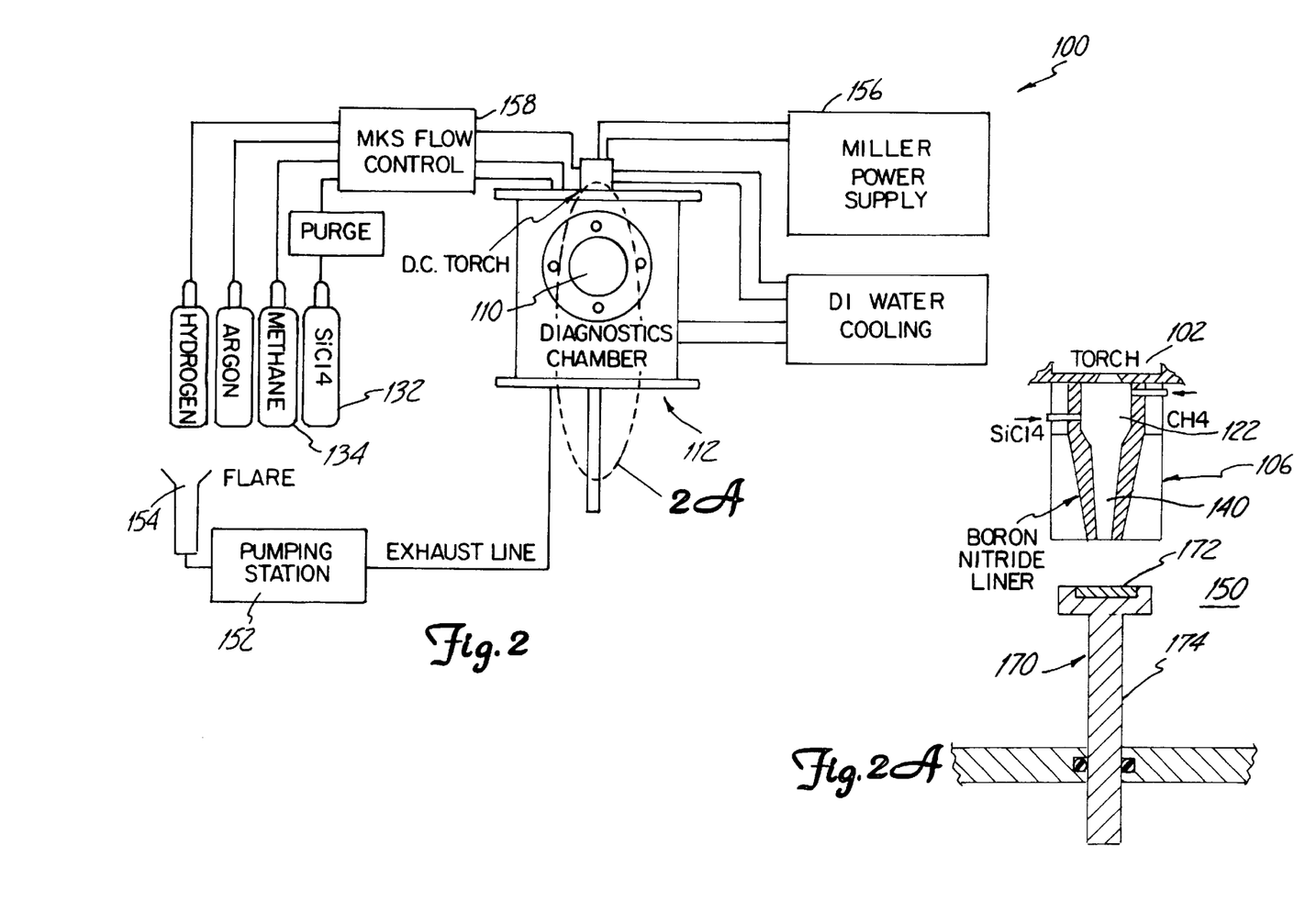
FIG. 2 is a simplified schematic diagram of a test apparatus used to form nanostructured materials.
Figure 3:
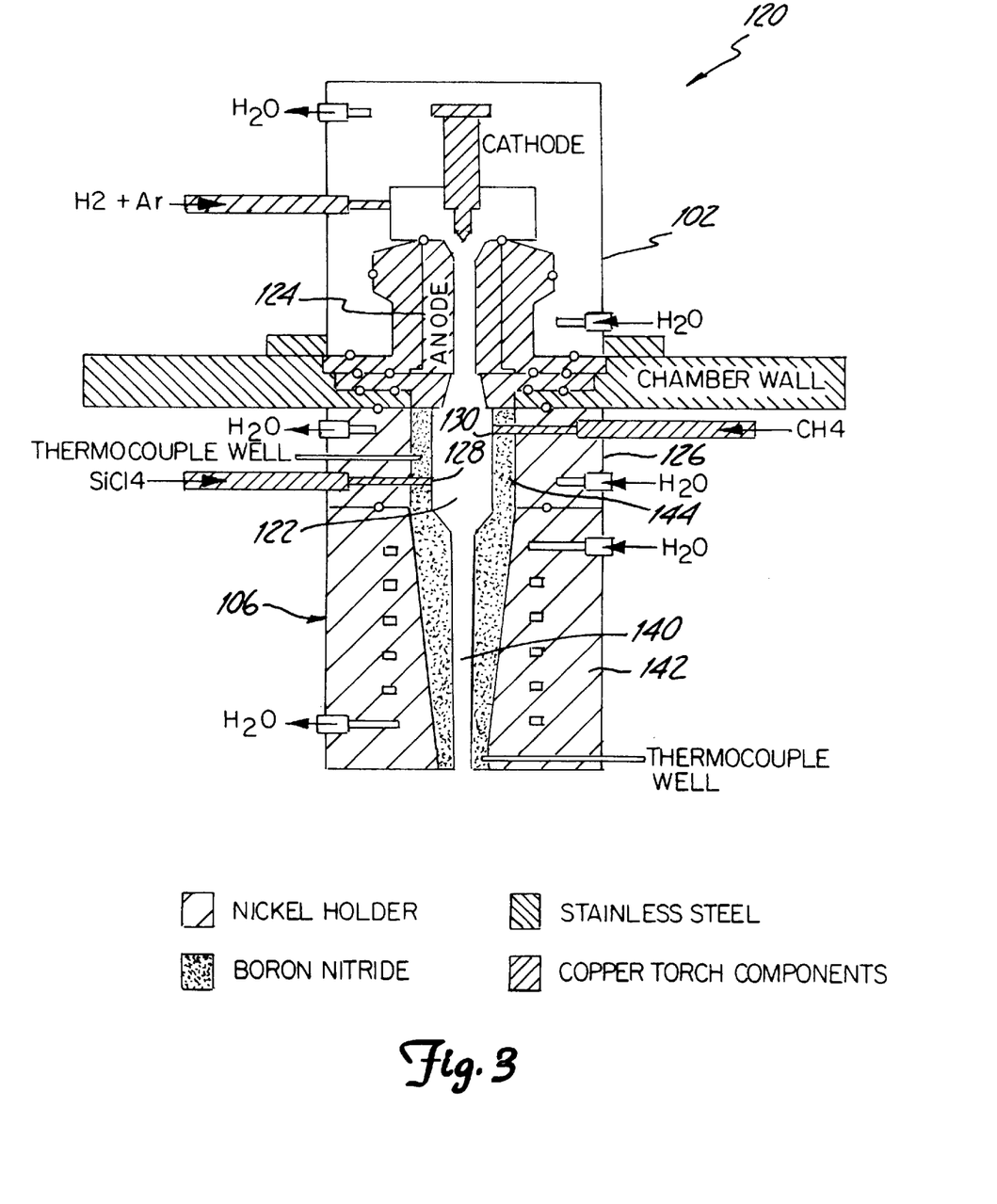
FIG. 3 is a cross-sectional view of an assembly including a nozzle and nanoparticle source in accordance with one aspect of the invention.

An example of such a method and process was used for the production of nanostructured silicon. FIG. 2 is a simplified diagram of the apparatus 100. In this example, the aerosol reactor used is a thermal plasma reactor similar to the one described in (Rao, N., Girshick, S., Heberlein, J., McMurry, P., Jones, S., Hansen, D., Micheel, B. (1995) "Nanoparticle formation using a plasma expansion process," *Plasma Chem. Plasma Proc.,* 15(4):581–606 and Rao, N., Micheel, B., Hansen, D., Fandrey, C., Bench, M., Girshick, S., Heberlein, J., and McMurry, P. H. (1995) "Synthesis of nanophase silicon, carbon and silicon carbide powders using a plasma expansion process," *J. Mater. Res.* 10(8) :2073–2084). The reactor assembly consists of a plasma torch 102, a reactant injection section, and a converging nozzle 106 mounted on the top flange of a water-cooled vacuum chamber. Side ports 110 in the chamber 112 allow installation of windows for observation, and of connections for the diagnostic equipment. The torch-nozzle assembly 120 is shown in FIG. 3. The torch 102 is a DC arc plasma gun (Miller, model SG-1B) with a special tungsten-lined nozzle 106 for argon-hydrogen operation. The injection section 122, about 25 mm long, is immediately downstream of the anode 124, and consists of a water-cooled nickel ring 126 with a ceramic liner and holes 128, 130 at two axial locations which are connected to the reactant supplies 132, 134. Typically gaseous precursors are used for simplicity and better control of feed rates. However, if a liquid precursor such as $SiCl_4$ is used, (as in this example) it may be introduced in the vapor phase through heated lines, and the flow rate may be controlled by suitable vapor-source mass flow controllers. The flow rates for the plasma gases and for the methane are controlled, e.g. by thermal mass flow controllers. Immediately following the injection section is a long nozzle 140 (around 100 mm long, of converging shape in this example) held in place by a water-cooled nickel holder 142. The nozzle 140 and the injection ring 144 are made of one piece of a high temperature ceramic such as boron nitride. The nozzle to substrate distance is, for example, on the order of 5 nozzle diameters (~25 mm), suitable for depositing particles with sizes on the order of 10 nm or larger. Typical dimensions of the flow channel are: an inside diameter of 15 mm in the injection section 122, and nozzle inlet and exit diameters of 10 mm and 5 mm, respectively, and a converging contour in the converging section as described in Rao, N., Girshick, S., Heberlein, J., McMurry, P., Jones, S., Hansen, D., Micheel, B. (1995) "Nanoparticle formation using a plasma expansion process," *Plasma Chem. Plasma Proc.,* 15(4):581–606. The flow exits the nozzle into the vacuum chamber 150, which has been held at a pressure of about 2 Torr using a pumping station 152 consisting of a roots blower, rotary vane mechanical pump and a liquid ring vacuum pump connected in series. The overall pumping capacity is on the order of 20,000 lpm. The water soluble byproducts (such as HCl in this example) in the exhaust gas stream are scrubbed by the liquid ring pump, and the gaseous combustibles (e.g. hydrogen) are flared off into a fume hood by flare 154. A torch power supply 150 and an associated control unit 158 complete the basic reactor set-up.

Downstream of the reactor assembly 120 is mounted a water-cooled substrate assembly 170. The substrate 172 is generally a heat conducting solid material (e.g. metals, ceramics, silicon, graphite). In the present example, the substrate 172 is a molybdenum disc about 20 mm in diameter clamped to a water-cooled holder 174, and placed about 1–10 nozzle-exit-diameters downstream of the nozzle (~5 nozzle diameters or 25 mm in this example). Substrate holder 174 is equipped for controlled substrate temperature by varying the heat conduction between substrate 172 and the water-cooled holder 174 (M. T. Bieberich and S. L. Girshick, "Control of Substrate Temperature During Diamond Deposition," *Plasma Chemistry and Plasma Processing,* Vol. 16, No. 1, pp. 157–168 (1996)). In principle, liquid nitrogen cooling may also be used. The substrate temperature may then be varied over a wide range from liquid nitrogen temperatures up (77K–1500K).

The synthesis procedure involves first the heating of the $SiCl_4$ lines to assure that the $SiCl_4$ is fully vaporized before it reaches the flow meter. Then the plasma torch 102 is started using a high frequency arc starter, the desired process pressures and carrier gas flow rates are established and the desired torch current level is set. After stable torch operation is attained, the reactant flow rates are set and measurements are initiated. Typical processing conditions are given below:

TABLE I

Typical processing conditions.

| | Typical Parameters | | Process Parameter Range |
|---|---|---|---|
| Arc current | 200 | A | 150–250 A |
| Arc voltage | 40 | V | |
| Nozzle inlet pressure | 70 | kPA | 70–100 kPA |
| Chamber pressure | 300 | Pa | 100–1000 Pa |
| Argon flow rate | 35 | slm | 25 slm–40 slm |
| Hydrogen flow rate | 4 | slm | 0–7.5 slm |
| Silicon tetrachloride flow | 0.2 | slm | 0.05–0.5 slm |

Figure 4:
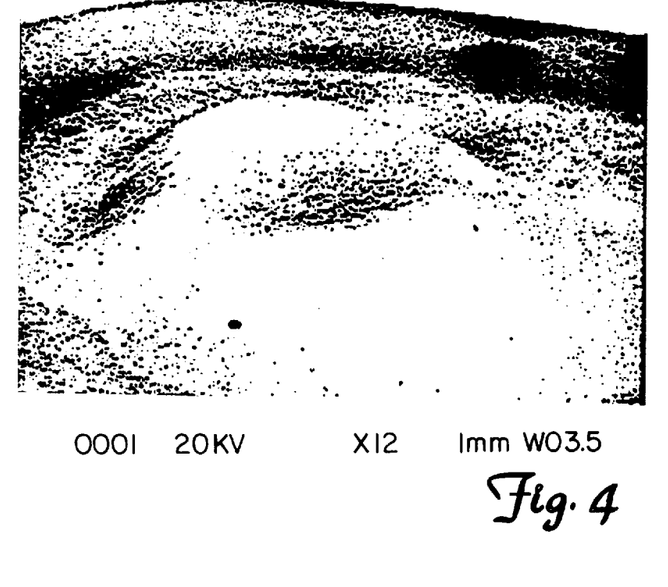
FIG. 4 is a SEM micrograph of silicon deposited in accordance with the present invention.

FIG. 4 is a SEM micrograph of the deposit obtained for a typical silicon deposition experiment. The silicon deposits are shaped in the form of a "mesa", with a "plateau" diameter close to that of the nozzle exit diameter (~5 mm). This deposit shape is consistent with that expected for deposits formed by particle impaction (4). The average growth rate for the silicon deposition is on the order of 60 $\mu$m/min, much higher than that obtained by conventional chemical vapor deposition techniques. It was possible to cleanly separate the deposit from the substrate during sample preparation, suggesting that this may be a good method for synthesizing free standing nanostructured silicon.

SEM analysis of vertically sectioned deposits also showed that they were reasonably uniformly compacted, though with some clearly visible porosity. X-ray diffraction analysis showed the deposited material to be polycrystalline silicon. Transmission electron microscopy (TFM) of thinned samples showed nanocrystalline structure close to the cooled substrate surface, with grain sizes of ~10 nm. Areas with larger grain sizes were also observed.

In addition to silicon deposition, the invention has general utility for depositing a wide range of high-temperature materials such as nitrides, borides, carbides, etc. The deposits formed by this process appear to be well compacted and adherent to the substrate, and have diameters roughly that of the nozzle exit. The deposition rates are quite high (e.g. on the order of 60 $\mu$m/min for the silicon process). Thus, this process is suitable for producing both coatings as well as bulk materials. XRD analysis has confirmed that the deposit is pure silicon, i.e there is no evidence of contaminants such as boron nitride (from the nozzle), or tungsten (from the electrodes).

Although the present invention has been described with reference to preferred embodiments, workers skilled in the art will recognize that changes may be made in form and detail without departing from the spirit and scope of the invention.

What is claimed is:

1. A method of producing nanostructured materials, comprising:
    aiming a nanoparticle accelerator at a target;
    forming nanoparticles;
    accelerating the nanoparticles toward the target to hypersonic velocities;
    impacting the target with the accelerated nanoparticles; and
    forming a nanostructured material on the target from accelerated nanoparticles as they impact the target.

2. An apparatus for production of nanostructured materials, comprising:
    a target;
    a source of material;
    a reactant chamber coupled to the source of material to receive the material therein;
    an energy source coupled to the reactant chamber to create nanoparticles from the material in the reactant chamber; and
    a nanoparticle accelerator coupled to the chamber to accelerate the nanoparticles to hypersonic velocities in a direction substantially toward the target whereby a nanostructured material is formed on the target upon impact of the nanoparticles.

3. The apparatus of claim 2 including an expansion chamber and wherein the nanoparticle accelerator includes a nozzle coupled to the expansion chamber and receiving the nanoparticles therethrough to thereby increase the velocity of the nanoparticles as they exit the nozzle.

4. The apparatus of claim 2 wherein the accelerator includes a cathode and an anode to impart acceleration to the nanoparticles.

5. The apparatus of claim 4 wherein the cathode and anode form a DC plasma torch.

6. The apparatus of claim 2 wherein the target includes a substrate having a first layer to trap a carrier gas material which accompanies the accelerated nanoparticles and allows the accelerated nanoparticles to pass therethrough, and a second layer adapted to receive the nanoparticles to form the nanostructure thereon.

7. The apparatus of claim 2 including a coolant coupled to the target to cool the target.

8. The apparatus of claim 2 including a coolant coupled to the nanoparticle accelerator to cool the accelerator.

9. The apparatus of claim 2 wherein the energy source comprises a laser.

10. The apparatus of claim 2 wherein the reactant chamber and the nanoparticle accelerator are an integral unit.

11. The apparatus of claim 2 wherein the nanoparticles are accelerated to more than about 0.5 km/s.

12. The apparatus of claim 2 wherein the nanoparticles impact the target at a sufficiently high velocity to induce non-equilibrium chemical modes in the nanoparticles.

13. The apparatus of claim 2 including a second hypersonic nanoparticle source aimed at the target to thereby form a nanostructured composite.

14. The apparatus of claim 2 wherein the nanoparticles are between about 1 nm and about 100 nm in size.

15. An apparatus for production of nanostructured materials, comprising:

a target;

a source of material;

a nanoparticle formation chamber coupled to the source of material to convert the material into nanoparticles;

an expansion chamber carrying the target therein; and a nozzle and nanoparticle accelerator integral with the nanoparticle formation chamber, the nozzle directed at the target through the expansion chamber to accelerate the nanoparticles to hypersonic velocities in a direction toward the target to thereby form a nanostructured material on the target upon impact of the nanoparticles.

16. The apparatus of claim 15 including a DC plasma torch to form the nanoparticles.

17. The apparatus of claim 15 including a coolant coupled to the nozzle and nanoparticle accelerator to cool the nozzle and nanoparticle accelerator.

18. The apparatus of claim 15 wherein the accelerator includes a cathode and an anode to accelerate the particles.

19. The apparatus of claim including 15 a carrier gas source coupled to the nanoparticle formation chamber to carry the nanoparticles to the target.

* * * * *

UNITED STATES PATENT AND TRADEMARK OFFICE
CERTIFICATE OF CORRECTION

PATENT NO. : 5,874,134
DATED : February 23, 1999
INVENTOR(S) : Nagaraja P. Rao et al.

It is certified that error appears in the above-indentified patent and that said Letters Patent is hereby corrected as shown below:

Col. 10, line 8, delete "including 15" and insert --15 including--.

Signed and Sealed this

Seventh Day of December, 1999

Attest:

Q. TODD DICKINSON

Attesting Officer

Acting Commissioner of Patents and Trademarks